United States Patent

Noguchi et al.

[11] Patent Number: 5,729,064
[45] Date of Patent: Mar. 17, 1998

[54] MULTI-POLE ELECTRIC MOTOR WITH BRUSH HOLDER DEVICE HAVING TWO TERMINAL ASSEMBLIES

[75] Inventors: Hideaki Noguchi; Masashi Fukui, both of Tochigi-ken; Atsushi Shimura, Gunma-ken, all of Japan

[73] Assignee: Mitsuba Corporation, Gunma-ken, Japan

[21] Appl. No.: 628,366

[22] Filed: Apr. 5, 1996

[30] Foreign Application Priority Data

Apr. 24, 1995 [JP] Japan ................... 7-124213
Apr. 24, 1995 [JP] Japan ................... 7-124214

[51] Int. Cl.[6] .................................. H02K 11/00
[52] U.S. Cl. .................... 310/68 R; 310/71; 310/248; 310/249
[58] Field of Search .................. 310/68 R, 248, 310/239, 245, 71, 251, 253, 252, 242

[56] References Cited

U.S. PATENT DOCUMENTS

| | | | |
|---|---|---|---|
| 4,845,396 | 7/1989 | Huber | 310/239 |
| 4,926,075 | 5/1990 | Fusao et al. | 310/239 |
| 4,963,779 | 10/1990 | Lentino et al. | 310/71 |
| 5,138,212 | 8/1992 | Wong et al. | 310/239 |
| 5,332,940 | 7/1994 | Kuragaki et al. | 310/239 |

Primary Examiner—Thomas M. Dougherty
Assistant Examiner—Tran Nguyen
Attorney, Agent, or Firm—Skjerven, Morrill, MacPherson, Franklin & Friel LLP; Thomas S. MacDonald

[57] ABSTRACT

In a multi-pole electric motor, the terminal pieces of same polarities are placed adjacent to each other while the terminal pieces of different polarities are placed remote from each other, and the terminal pieces of common polarities are connected by shunt tabs which can be selectively cut apart. For instance, when a four-pole electric motor is to be used as a one-speed motor, the shunt tabs connected across associated terminal pieces are not cut apart, and the terminal pieces are appropriately connected to external power lines. When the motor is to be used as a two-speed motor, the shunt tabs connected across associated terminal pieces are cut apart, and the terminal pieces are appropriately connected to external power lines. Thus, the electric motor can be readily adapted either as a one-speed motor or a two-speed motor by using standardized component parts. Furthermore, even when the motor should overheat, there would be no short-circuiting, and the reliability of the motor can be improved.

14 Claims, 5 Drawing Sheets

MULTI-POLE ELECTRIC MOTOR WITH BRUSH HOLDER DEVICE HAVING TWO TERMINAL ASSEMBLIES

TECHNICAL FIELD

The present invention relates to a multi-pole DC electric motor, and in particular to a multi-pole DC electric motor which can be selectively converted into a one-speed motor or to a two-speed motor.

BACKGROUND OF THE INVENTION

In a DC electric motor, a plurality of brushes are arranged around a commutator of a motor armature, and leads electrically connected to these brushes are passed out of the electric motor to be connected to an external power source. When the electric motor consists of a one-speed motor, the leads are simply grouped into two parts which are connected to positive and negative terminals of the power source. When the electric motor consists of a two-speed motor or an electric motor having a larger number of selectable speeds, the leads are required to be grouped into three or more parts so that they may be connected to the power source via a speed control circuit.

For instance, when a four-pole electric motor is to be selectively modified to or manufactured as a one-speed motor or to a two-speed motor, as illustrated in FIGS. 5A and 5B, lead wires 22 extend from the four brushes 3 to 6 via pig tails 3a, 4a, 5a and 6a, and are connected in either one of two different ways. More specifically, in the case of a one-speed motor (FIG. 5A), the lead wires 22 are led out from a single location via a rubber grommet 23, and in the case of a two-speed motor, the lead wires 22 are led out from two locations via rubber grommets 23 and 24 (FIG. 5B).

Conventionally, as illustrated in the drawings, even in the case of the two-speed motor, to the end of minimizing the modification from the one-speed motor, each pair of lead wires 22 having different polarities were passed through a common grommet. Therefore, should the grommet carbonize as a result of the overheating of the electric motor, the lead wires 22 could short-circuit. Moreover, because of the need to reconnect the lead wires 22 and the need to modify the associated component parts when selectively modifying the electric motor between a one-speed motor and a two-speed motor, the number of component parts that need to be managed and the amount of work involved were both substantial.

BRIEF SUMMARY OF THE INVENTION

In view of such problems of the prior art, a primary object of the present invention is to provide a multi-pole electric motor which can be selectively fabricated as or modified into a one-speed motor or a two-speed motor both economically and easily.

A second object of the present invention is to provide a highly reliable multi-pole electric motor at a minimum cost.

A third object of the present invention is to provide a highly reliable multi-pole electric motor which is easy to manufacture.

These and other objects of the present invention can be accomplished by providing an electric motor having four or more poles, comprising: an end bracket carrying a plurality of brush holders arranged around a commutator of a motor armature of the electric motor, each brush holder receiving a motor brush therein; at least a pair of terminal assemblies, at least one of the terminal assemblies including at least two terminals pieces which are individually connected to different ones of the brushes; lead means which are connected between the motor brushes and the terminal assemblies; and shunt means for selectively connecting and disconnecting the two terminal pieces of the terminal assembly.

Thus, for instance, when a four-pole electric motor is to be used as a one-speed motor, the shunt means extending across the associated pair of terminal pieces is connected, and the external power lines from a power source are each connected to a corresponding one of the terminal assemblies. Likewise, when a four-pole electric motor is to be used as a two-speed motor, the shunt means extending across the associated pair of terminal pieces is cut apart, and the external power lines from a speed control circuit are each connected to a corresponding one of the terminal pieces. Even when the electric motor is provided with a larger number of poles, and it is to be converted into a three-speed or four-speed motor, all that is required is to selectively cut apart each of the shunt means extending across associated pairs of terminal pieces, and connect external lines from a speed control circuit to corresponding terminal pieces. In particular, because the terminal pieces of same polarities are arranged in common terminal assemblies and close to each other, the lead wires of same polarities can be passed through common grommets. Therefore, even when the grommets have degraded, and damaged, and the lead wires touch each other, as they belong to a same polarity, speed control may be affected, but the motor can still continue to rotate.

According to a preferred embodiment of the present invention, the shunt means comprises an extension tab which integrally extends from one of the terminal pieces, and adapted to be selectively welded to the other terminal piece or cut off.

To simplify the production process, preferably, the end bracket comprises a brush holder stay made of resin material, and the lead means comprises strips of sheet metal which are at least partly insert molded with the brush holder stay. When the sheet metal strips of same polarities are grouped into common terminal assemblies each belonging to a same polarity, the sheet metal strips inevitably have to cross each other, and a certain insulation gap must be defined between the sheet metal strips where they overlap each other. To simplify the fabrication process, one of the sheet metal strips may be provided with a projection adjacent to a part thereof overlapping with the other sheet metal strip, the projection extending substantially perpendicularly to a surface of the brush holder stay and having a free end which is substantially flush with or extends short of the surface of the brush holder stay when the insulation gap of a prescribed size is defined between the sheet metal pieces. The projection may consist of a tab integral with the sheet metal strip, and bent at a right angle.

The free end of the projection may be used for visually determining the position of the projection relative to the other sheet metal strip, and thereby ensuring a satisfactory insulation gap between the two sheet metal strips or with respect to other metallic parts. The free end of the projection may be placed in such a position that the free end abuts a die surface of the molding die for the brush holder stay whereby the position of the one sheet metal strip in the brush holder stay may be automatically determined during the molding process.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
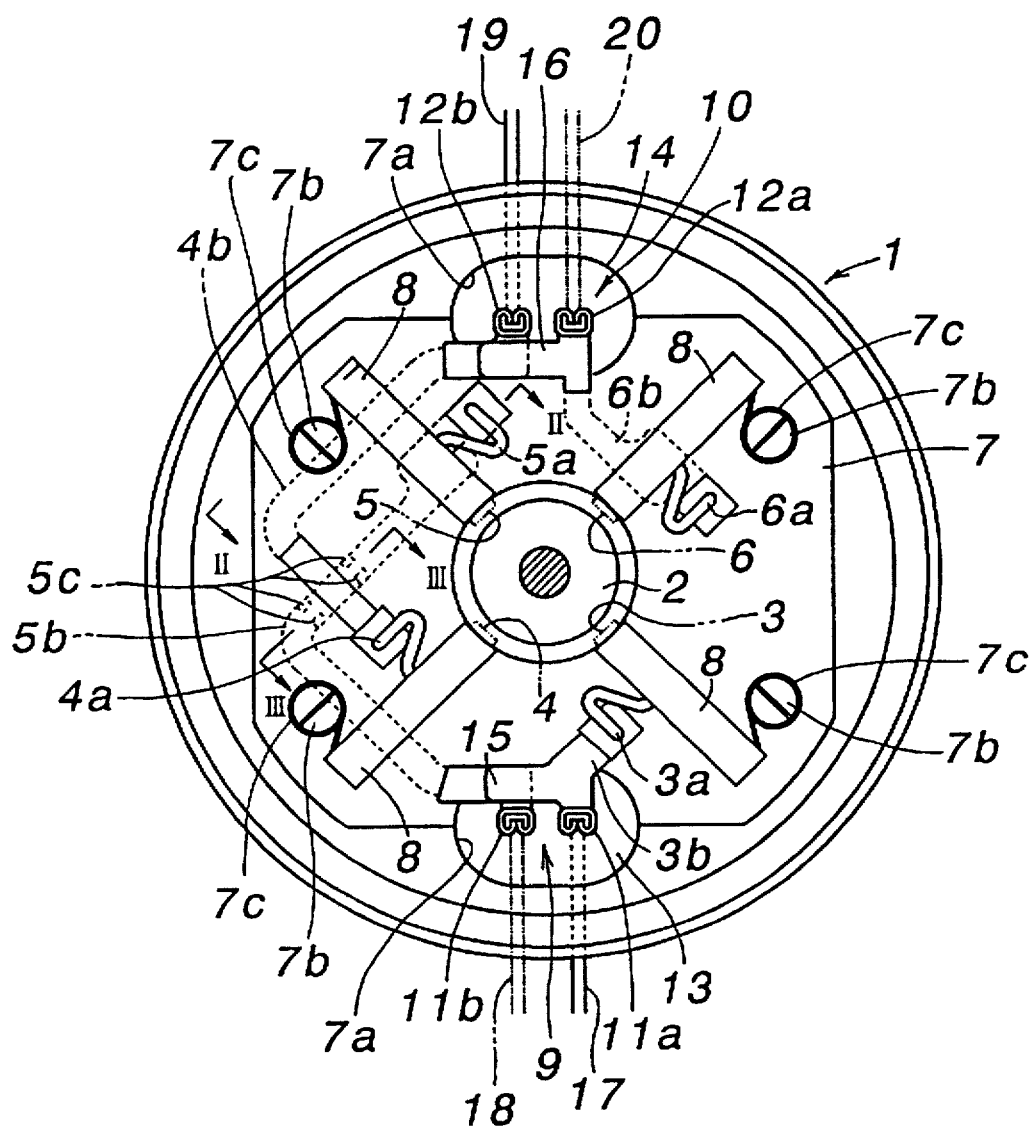
FIG. 1 is an end view of an end bracket as seen from the interior of a preferred embodiment of the multi-pole electric motor constructed as a four-pole electric motor according to the present invention.
Figure 2:
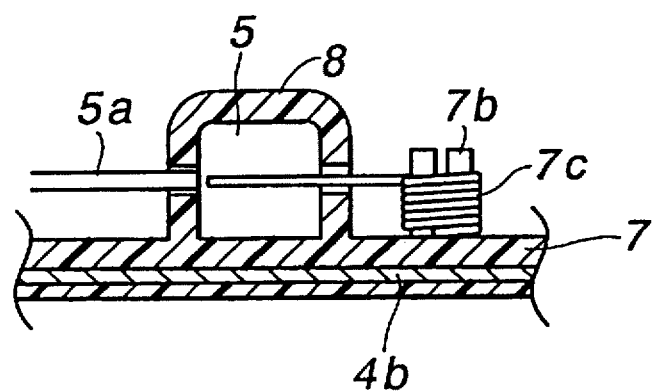
FIG. 2 is a sectional view taken along line II—II of FIG. 1.

FIG. 1 is a view of an end bracket 1 as seen from inside a four-pole electric motor to which the present invention is applied. This end bracket 1 retains two pairs of brushes 3 to 6 which are arranged diagonally across a centrally located commutator 2 via a brush holder stay 7 made of synthetic resin material and brush holders 8 integrally molded with the brush holder stay 7. Referring also to FIG. 2, each of the brushes 3 to 6 are urged toward the commutator 2 by a torsion coil spring 7c supported by a column 7b projecting from the brush holder stay 7. The brushes 3 to 6 are connected to external power lines in such a manner that each opposing pair of the brushes are of a same polarity (positive pole—brushes 3 and 5, and negative pole—brushes 4 and 6). The brushes 3 to 6 are connected to terminal pieces 11a, 11b, 12a and 12b via pig tails 3a, 4a, 5a and 6a, and the sheet metal strips 3b, 4b, 5b and 6b.

The positive terminal pieces 11a and 11b are grouped into a first terminal assembly 9, and are arranged adjacent to each other in a lower part of the drawings while the negative terminal pieces 12a and 12b are similarly grouped into a second terminal assembly 10, and are arranged adjacent to each other in an upper part of the drawings. An external power line 17 leading out from the terminal 11a is retained by a rubber grommet 13 while another external power line 19 leading out from the terminal 12a is retained by another rubber grommet 14. The brush holder stay 7 is provided with holes 7a for fitting and retaining the rubber grommets 13 and 14 therein, and these holes 7a are used also for allowing access when separating or cutting off electroconductive pieces or shunt tabs 15 and 16 as described hereinafter.

Figure 3:
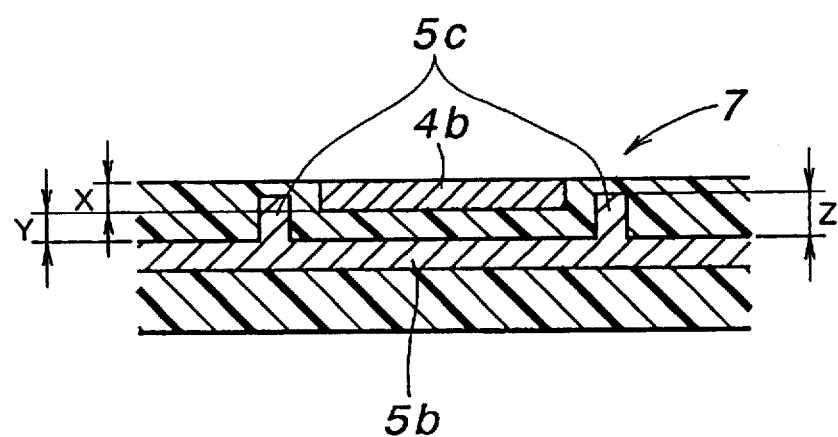
FIG. 3 is a sectional view taken along line III—III of FIG. 1.

A plurality of sheet metal strips 3b, 4b, 5b and 6b, as well as the brush holders 8, are insert molded with the brush holder stay 7. As best illustrated in FIG. 3 showing a sectional view taken along line III—III of FIG. 1, the sheet metal strips 4b and 5b partly cross each other, one of the sheet metal strips 4b being exposed at a surface of the brush holder stay 7. The other sheet metal strip 5b is spaced from the one sheet metal strip 4b, and is provided with four projections 5c directed toward the one sheet metal strip 4b. In this embodiment, these projections 5c are integrally formed with the sheet metal strip 5b, and are bent at a right angle with respect to the major surface of the sheet metal strip 5b or the surface of the brush holder stay 7. The length Z of each of the projections 5c is somewhat smaller than the combined length of the thickness of the first conductor 4b X and the insulation gap Y between the two sheet metal strips 4b and 5b (Z<X+Y). Thereby, it is possible to readily detect any improper insulation by visually determining if the projections 5c are exposed from the surface of the first sheet metal strip 4b or not. It is also possible to set these dimensions such that a proper insulation distance between the two sheet metal strips 4b and 5b be ensured during the molding process with the projections 5c abutting a die surface, and the short-circuiting of the sheet metal strips 4b and 5b can be thereby avoided without complicating the manufacturing process.

Figure 4A:
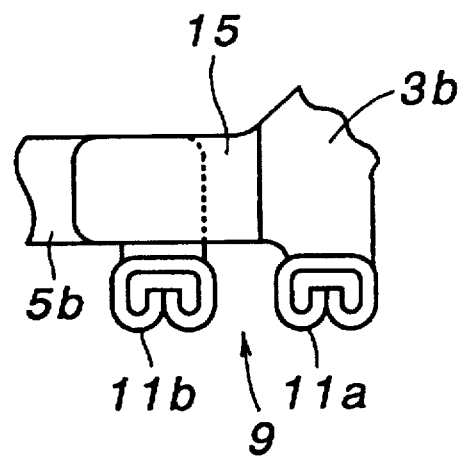
FIGS. 4A and 4B are front and side views of an essential part of the preferred embodiment fabricated as a one-speed motor.
Figure 4C:
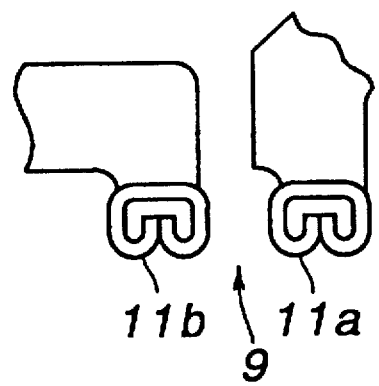
FIGS. 4C and 4D are views similar to FIGS. 4A and 4B showing the preferred embodiment fabricated as a two-speed motor.
Figure 4B:
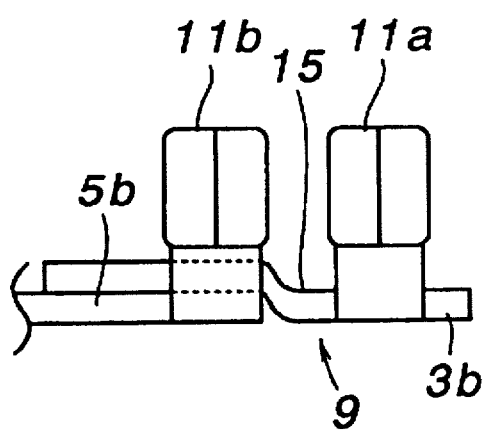
Figure 4D:
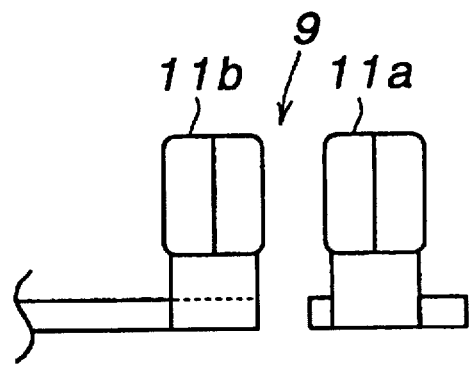
Figure 5A:
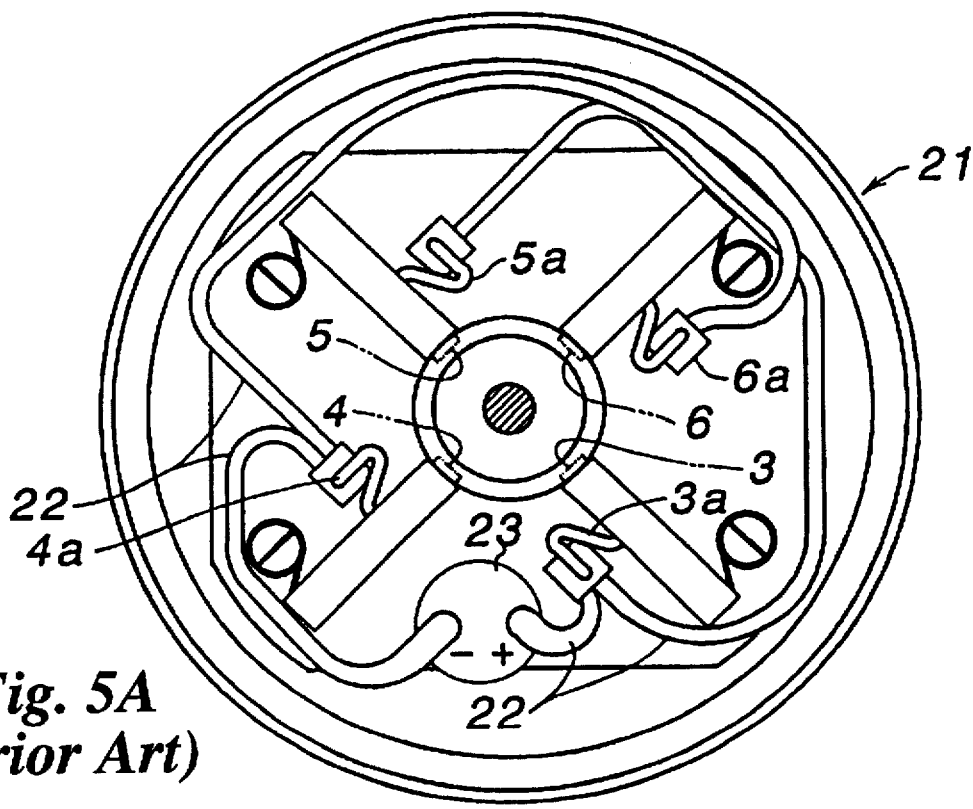
FIGS. 5A and 5B are views similar to FIG. 1 showing a conventional four-pole electric motor fabricated as a one-speed motor and a two-speed motor, respectively.
Figure 5B:
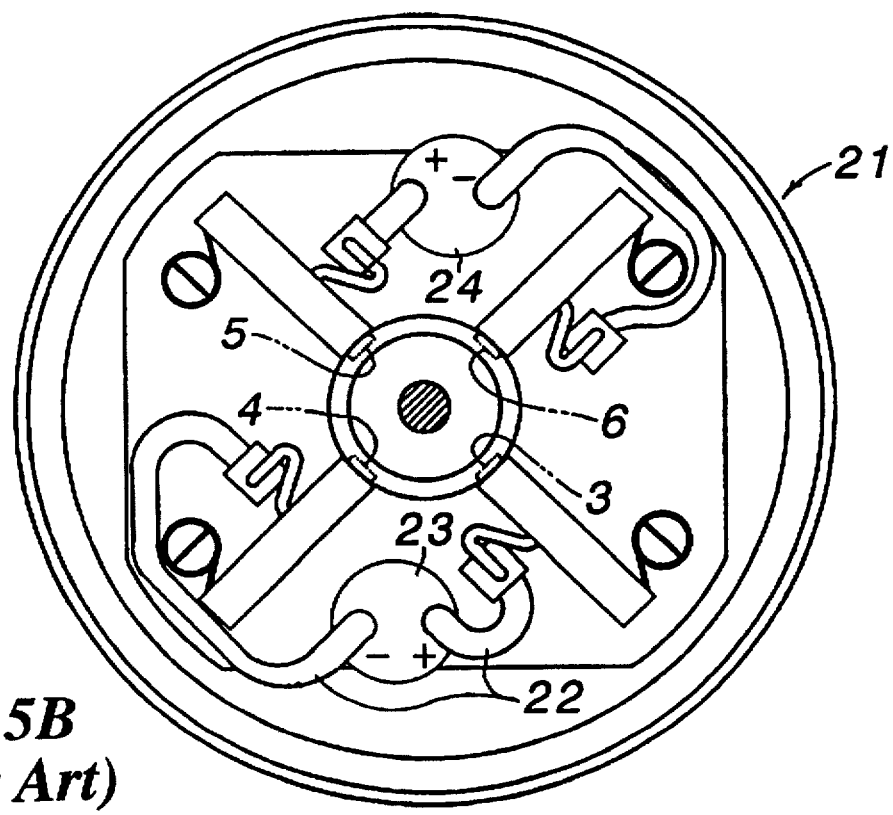

Referring to FIGS. 4(a) and 4(c), the terminals 11a and 11b which belong to the first terminal assembly 9 and are placed adjacent to each other are electrically connected to each other by welding an extension shunt tab 15, which is integrally formed with the sheet metal strip 3b, to the sheet metal strip 5b in a selective manner. Similarly, the terminal 12a and 12b which belong to the second terminal assembly 10 and are placed adjacent to each other are electrically connected to each other by welding a similar extension shunt tab 16, which is again integrally formed with the sheet metal strip 6b, to the sheet metal strip 4b in a selective manner. Therefore, when the four-pole electric motor is to be used as a one-speed motor, the shunt tabs 15 and 16 are not removed, and external power lines are connected to appropriate terminals. When the four-pole electric motor is to be used as a two-speed motor, the shunt tabs 15 and 16 connected across associated pairs of terminal pieces are disconnected by using a suitable cutting tool (FIGS. 4(b) and 4(d)) by making use of the holes 7a of the brush holder stay 7, and the terminal pieces are appropriately connected to external power lines 17 to 20 part of which are shown by imaginary lines. These power lines are connected to a speed control circuit not shown in the drawings. FIGS. 4(a) to 4(d) are enlarged views of the arrangement used for connecting the terminal pieces 11a and 11b, and the corresponding part associated with the terminals 12a and 12b is not illustrated as it is similar to this arrangement.

In the above described embodiment, the length Z of the projections 5c, the thickness X of the first sheet metal strip 4b, and the insulation distance Y between the sheet metal strips 4b and 5b were related so that Z<X+Y. By setting the relationship such that Z=X+Y, a proper insulation can be verified by determining if the free ends of the projections 5c are flush with the surface of the brush holder stay 7 or not.

In the embodiment described above, the shunt tabs were integrally formed with the associated sheet metal strips, and were welded to the opposing terminal pieces by welding. However, the invention is not limited to this embodiment, and the shunt tabs may consist of separate members which may be welded across associated pairs of the terminal pieces. The external power lines of same polarities were passed through the common grommets in this embodiment, but the terminals of the same polarities inside the electric motor may be directly passed through the associated grommets so that the external power lines may be connected to the associated terminals outside the electric motor.

The structure involving the use of the projections 5c was applied to a part where two sheet metal strips are both insert molded and cross each other, but is not limited to this embodiment. For instance, a similar result can be achieved by insert molding one of the sheet metal strips with the brush holder stay while placing the other sheet metal strips on the brush holder stay by other means, and applying the present invention to this part. One of the sheet metal strips may overlap other metallic part, and this arrangement can be applied to such a part if an insulation gap is desired to be defined between the sheet metal strip and the metallic part.

As can be understood from the above description, according to the multi-pole electric motor of the present invention, the terminal pieces of same polarities can be placed adjacent to each other while the terminal pieces of different polarities are placed remote from each other, and the terminal pieces of common polarities are connected by shunt means which can be selectively cut apart. Thereby, even when the motor should overheat, there would be no short-circuiting, and the reliability of the motor can be improved. For instance, when a four-pole electric motor is to be used as a one-speed motor, the shunt means connected across associated terminal pieces are not cut apart, and the terminal pieces are appropriately connected to external power lines. When the motor is to be used as a two-speed motor, the shunt means connected across associated terminal pieces are cut apart, and the terminal pieces are appropriately connected to external power lines. Further, when the motor has a larger number of poles, and are desired to be used as a three-speed motor or a motor having a larger number of speed selections, the shunt means connected across associated terminal pieces are selectively cut apart, and the terminal pieces are appropriately connected to external power lines or a speed control circuit. Thus, the component parts can be standardized, and not only the number of components parts that need to be managed can be reduced but also the work involved in wiring can be simplified. In particular, by grouping together the terminals having same polarities, each group of lead wires of a same polarity can be received in a common grommet.

Furthermore, by exposing one of the lead means at the surface of the brush holder stay, and providing the other lead means with a projection which is directed toward the one lead means, and projects from the surface when the two lead means are too close to each other, at a part where the two lead means, which are insert molded with the brush holder stay, cross each other, a proper insulation distance between the two lead means can be ensured by adjusting the position of the other lead means while visually observing if the projection of the other lead means projects from the surface at the part where the two lead means cross each other during the process of molding the brush holder stay. Also, by determining if the projection of the other lead means is exposed or not after the molding process, it is possible to readily detect any loss of insulation. Thus, the reliability of the produced electric motor can be improved. Furthermore, during the molding process, a minimum tolerable distance can be ensured between the two lead means by the projection abutting the die surface. Therefore, even in absence of any proper testing, any short-circuiting can be avoided, and the reliability of the produced electric motor can be improved even further.

Although the present invention has been described in terms of a preferred embodiment thereof, it is obvious to a person skilled in the art that various alterations and modifications are possible without departing from the scope of the present invention which is set forth in the appended claims.

What we claim is:

1. A multi-pole electric motor having four or more poles, comprising:
    an end bracket carrying a plurality of brush holders arranged around a commutator of a motor armature of said electric motor, each brush holder receiving a motor brush therein;
    at least a pair of terminal assemblies, each terminal assembly including at least two terminal pieces of the same polarity which are individually connected to different ones of said brushes and which are located radially across from each other;
    leads which are connected between said motor brushes and said terminal assemblies; and
    separable shunts for selectively connecting or disconnecting said two terminal pieces of each of said terminal assemblies.

2. A multi-pole electric motor according to claim 1, comprising at least two grommets each for passing two lead wires extending from different terminal connections of said terminal assemblies.

3. A multi-pole electric motor according to claim 1, wherein said electric motor is fabricated as a one-speed motor by connecting said shunts, connecting a positive terminal of a power source to leads of a first terminal assembly and connecting a negative terminal of the power source to leads of a second terminal assembly of said terminal assemblies.

4. A multi-pole electric motor according to claim 1, wherein said electric motor is fabricated as a two-speed motor by disconnecting said shunts, connecting positive terminals of a power source to leads of a first terminal assembly and connecting the negative terminals of the power source to leads of a second terminal assembly of said terminal assemblies.

5. A multi-pole electric motor according to claim 1, wherein each of said shunts comprises an extension tab which integrally extends from one of said terminal pieces toward the other terminal piece situated on the same terminal assembly, said extension tab being either in an integral connection between the terminal pieces or cut off.

6. A multi-pole electric motor according to claim 1, wherein said end bracket comprises a brush holder stay made of resin material, and each of said leads comprises strips of sheet metal which are in an at least partly insert molded connection with said brush holder stay.

7. A multi-pole electric motor according to claim 6, wherein said sheet metal strips partly overlap each other with a certain insulation gap defined therebetween.

8. A multi-pole electric motor having four or more poles, comprising:
    an end bracket carrying a plurality of brush holders arranged around a commutator of a motor armature of said electric motor, each brush holder receiving a motor brush therein;
    at least a pair of terminal assemblies, each terminal assembly including at least two terminal pieces which are individually connected to different ones of said brushes;
    leads which are connected between said motor brushes and said terminal assemblies;
    shunt means for selectively connecting or disconnecting said two terminal pieces of each of said terminal assemblies;
    wherein said end bracket comprises a brush holder stay made of resin material, and said leads comprise strips of sheet metal which are in an at least partly insert molded connection with said brush holder stay;
    wherein said sheet metal strips partly overlap each other with a certain insulation gap defined therebetween; and
    wherein one of said sheet metal strips is provided with a projection adjacent to a part thereof overlapping with another one of said sheet metal strips, said projection extending substantially perpendicularly to a surface of said brush holder stay and having a free end which is substantially flush with surface of said brush holder stay when said insulation gap is defined between said sheet metal strips.

9. A multi-pole electric motor having four or more poles, comprising:

an end bracket carrying a plurality of brush holders arranged around a commutator of a motor armature of said electric motor, each brush holder receiving a motor brush therein;

at least a pair of terminal assemblies, each terminal assembly including at least two terminal pieces which are individually connected to different ones of said brushes;

leads which are connected between said motor brushes and said terminal assemblies;

shunt means for selectively connecting or disconnecting said two terminal pieces of each of said terminal assemblies;

wherein said end bracket comprises a brush holder stay made of resin material, and said leads comprise strips of sheet metal which are in an at least partly insert molded connection with said brush holder stay;

wherein said sheet metal strips partly overlap each other with a certain insulation gap defined therebetween; and wherein one of said sheet metal strips is provided with a projection adjacent to a part thereof overlapping with another one of said sheet metal strips, said projection extending substantially perpendicularly to a surface of said brush holder stay and having a free end which extends close to the surface of said brush holder stay when said insulation gap is defined between said sheet metal strips.

10. An electric motor having a plurality of poles, comprising:

an end bracket including a brush holder stay made of resin material;

a plurality of brush holders attached to said brush holder stay so as to surround a commutator of a motor armature of said electric motor, each brush holder receiving a motor brush therein;

a plurality of terminal assemblies attached to said brush holder stay;

lead means which are connected between said motor brushes and said terminal assemblies, said lead means including a first metallic piece which is at least partly insert molded in said brush holder, and a second metallic piece placed on one side of said brush holder in an at least partly overlapping relationship to said first metallic piece so as to define an insulation gap therebetween;

wherein one of said metallic pieces is provided with a projection adjacent to a part thereof overlapping with the other metallic pieces.

11. A multi-pole electric motor according to claim 10 wherein said metallic pieces comprise sheet metal strips of the same polarity.

12. A multi-pole electric motor according to claim 10 wherein one of said metallic pieces is provided with a pair of projections extending on opposite sides of the other metallic piece.

13. A multi-pole electric motor according to claim 10 wherein said projection extends substantially perpendicularly to a surface of said brush holder stay and having a free end which is substantially flush with said surface of said brush holder stay when said insulation gap is defined between said metallic pieces.

14. A multi-pole electric motor according to claim 10 wherein said projection extends substantially perpendicularly to a surface of said brush holder stay and having a free end which extends close to said surface of said brush holder stay when said insulation gap is defined between said sheet metal pieces.

* * * * *